United States Patent
Zenou (10) Patent No.: US 12,145,347 B2
(45) Date of Patent: Nov. 19, 2024

(54) METHODS FOR DEPOSITING SPACERS ON A MEMBRANE

(71) Applicant: Reophotonics Ltd., Modiin (IL)

(72) Inventor: Michael Zenou, Hashmonaim (IL)

(73) Assignee: Reophotonics Ltd., Modiin (IL)

( * ) Notice: Subject to any disclaimer, the term of this patent is extended or adjusted under 35 U.S.C. 154(b) by 140 days.

(21) Appl. No.: 18/187,457

(22) Filed: Mar. 21, 2023

(65) Prior Publication Data

US 2023/0311469 A1    Oct. 5, 2023

Related U.S. Application Data

(60) Provisional application No. 63/327,443, filed on Apr. 5, 2022.

(51) Int. Cl.
*B32B 37/00*    (2006.01)
*B01D 67/00*    (2006.01)
(Continued)

(52) U.S. Cl.
CPC ........ *B32B 37/025* (2013.01); *B01D 67/0081* (2013.01); *B32B 3/085* (2013.01); *B32B 7/12* (2013.01); *B32B 15/043* (2013.01); *B32B 15/08* (2013.01); *B32B 37/1284* (2013.01); *B32B 2307/412* (2013.01); *B32B 2310/0843* (2013.01); *B32B 2311/00* (2013.01); *C02F 1/44* (2013.01)

(58) Field of Classification Search
CPC .................................. B32B 7/12; B32B 37/12
See application file for complete search history.

(56) References Cited

U.S. PATENT DOCUMENTS

| 4,902,417 A | 2/1990 | Lein |
| 6,989,097 B2 | 1/2006 | Karode et al. |

(Continued)

FOREIGN PATENT DOCUMENTS

| JP | 2020119952 A | * 8/2020 | ........... B32B 43/006 |
| WO | 2020/085925 A1 | 4/2020 | |
| WO | WO-2020229016 A1 | * 11/2020 | ........ B01L 3/502707 |

OTHER PUBLICATIONS

Machine translation JP2020119952A1 (Year: 2020).*
(Continued)

*Primary Examiner* — Jacob T Minskey
*Assistant Examiner* — Wayne K. Swier
(74) *Attorney, Agent, or Firm* — Ascenda Law Group, PC (57) ABSTRACT

Spacers may be attached onto a membrane by a method in which adjacent ones of the spacers are spaced apart from one another with spacings that are accurate to a very fine tolerance. In the method, adjacent ones of the spacers may be attached to one another via lateral members so as to fix the relative spacing between the spacers. The spacers arranged with the fixed spacing may be attached to a transparent substrate via one or more intermediate layers, and thereafter, the lateral members may be severed. Afterwards, a surface of each of the spacers facing away from the transparent substrate may be coated with an adhesive layer. The spacers may be pressed against a membrane so as to attach the spacers to the membrane via the adhesive layer. After being attached to the membrane, the spacers may be detached from the transparent substrate.

15 Claims, 12 Drawing Sheets

(51) Int. Cl.
*B32B 3/08*      (2006.01)
*B32B 7/12*      (2006.01)
*B32B 15/04*     (2006.01)
*B32B 15/08*     (2006.01)
*B32B 37/12*     (2006.01)
*C02F 1/44*      (2023.01)

(56) References Cited

U.S. PATENT DOCUMENTS

| | | | |
|---|---|---|---|
| 8,808,645 B2* | 8/2014 | Jackson | B29D 11/0074 |
| | | | 210/488 |
| 10,899,120 B2* | 1/2021 | Gosnell | B42D 25/455 |
| 2007/0062857 A1 | 3/2007 | Popa et al. | |
| 2010/0096316 A1* | 4/2010 | Chikura | B01D 63/101 |
| | | | 210/321.83 |
| 2021/0213390 A1* | 7/2021 | Okazaki | B01D 63/107 |

OTHER PUBLICATIONS

Machine translation WO2020229016A1 (Year: 2020).*
International Search Report and Written Opinion mailed May 12, 2023, from the ISA/European Patent Office, for International Patent Application No. PCT/IB2023/052783 (filed Mar. 22, 2023), 9 pgs.

* cited by examiner

FIG. 2A
(Side view)

FIG. 2B
(Top view)

METHODS FOR DEPOSITING SPACERS ON A MEMBRANE

RELATED APPLICATIONS

This application is a nonprovisional of, claims priority to, and incorporates by reference U.S. Provisional Application No. 63/327,443, filed on 5 Apr. 2022.

FIELD OF THE INVENTION

The present invention relates to methods for depositing one or more spacers, e.g., a polymer spacer for a filter, on a membrane.

BACKGROUND

In the manufacture of mechanical filters, such as those used for water filtration, it is necessary to form an array of spacers on a membrane. Existing methods for forming an array of spacers on a membrane include screen printing. There are challenges, however, associated with using the existing methods for controlling the spacing between the spacers to a very fine tolerance. Techniques are discussed hereinbelow for addressing such challenges.

SUMMARY OF THE INVENTION

According to one embodiment of the invention, spacers may be attached onto a membrane by a method in which adjacent ones of the spacers are spaced apart from one another with spacings that are accurate to a very fine tolerance. In the method, adjacent ones of the spacers (more specifically, the sides thereof) may be attached to one another via lateral members so as to fix the relative spacing between the spacers. In an arrangement in which it is desired for the spacers to be uniformly spaced apart from one another, each of the lateral members may have an identical length (or a nearly identical length). The spacers arranged with the fixed spacing may be attached to a transparent substrate via one or more intermediate layers (e.g., metal layer, adhesive layer).

After the spacers have been attached to the transparent substrate, at least a portion of each of the lateral members may be severed so that adjacent ones of the spacers are no longer attached to one another via the respective lateral members. In one embodiment, the lateral members may be severed by guiding a saw between adjacent ones of the spacers. In another embodiment, the lateral members may be severed by scanning a laser beam between adjacent ones of the spacers.

A spraying apparatus may be used to coat a surface of each of the spacers facing away from the transparent substrate with an adhesive layer. Next, the spacers may be pressed against a membrane so as to attach the spacers to the membrane via the adhesive layer. After being attached to the membrane, the spacers may be detached from the transparent substrate by using a laser beam to ablate portions of a metal layer disposed between the transparent substrate and the spacers. More specifically, the transparent substrate may be transparent to the wavelength(s) of the laser beam used for the ablation step.

These and further embodiments of the invention are described in detail below.

BRIEF DESCRIPTION OF THE DRAWINGS

The present invention is illustrated by way of example, and not limitation, in the figures of the accompanying drawings, in which.

DETAILED DESCRIPTION OF THE INVENTION

In the manufacture of mechanical filters, such as those used for water filtration, it is necessary to form an array of spacers on a membrane. The spacers may be of a variety of shapes, however, for convenience the present discussion will concern spacers having a disc shape. It should be recognized, however, that the present methods are applicable to spacers of any shape. Further, while the present discussion will primarily concern spacers made from organic polymer materials, this too is only for convenience and the present methods are applicable to spacers of any of a variety of materials, including by not limited to metals, metal alloys, biocompatible organic materials, polymers, and other materials.

Figure 1A:
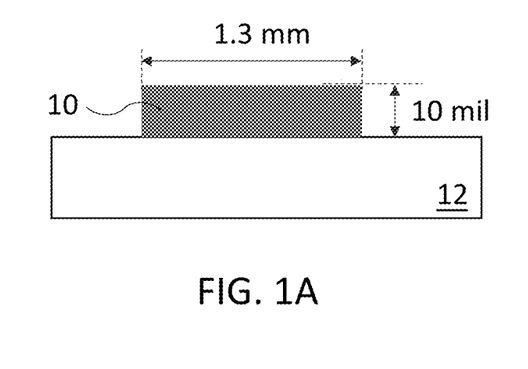
FIG. 1A depicts a cross-sectional view of a spacer disposed on a membrane, in accordance with one embodiment of the invention.
Figure 1B:
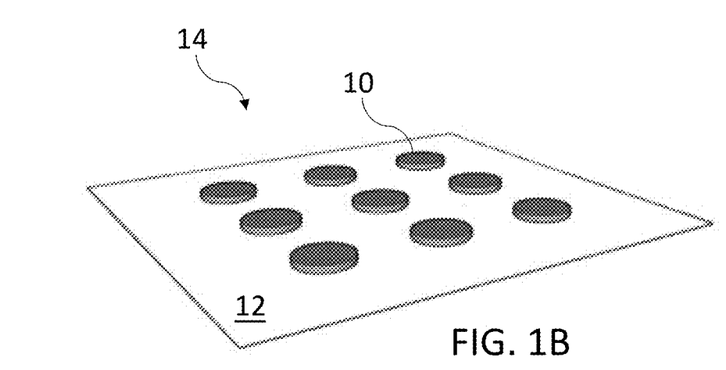
FIG. 1B depicts a perspective view of a two-dimensional array of spacers arranged on a membrane, in accordance with one embodiment of the invention.
Figure 1C:
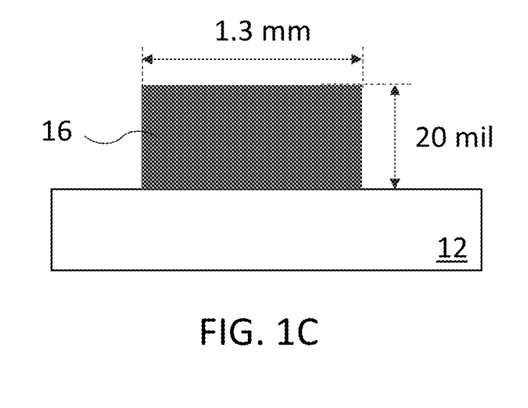
FIG. 1C depicts a cross-sectional view of a spacer disposed on a membrane, in accordance with one embodiment of the invention.
Figure 1D:
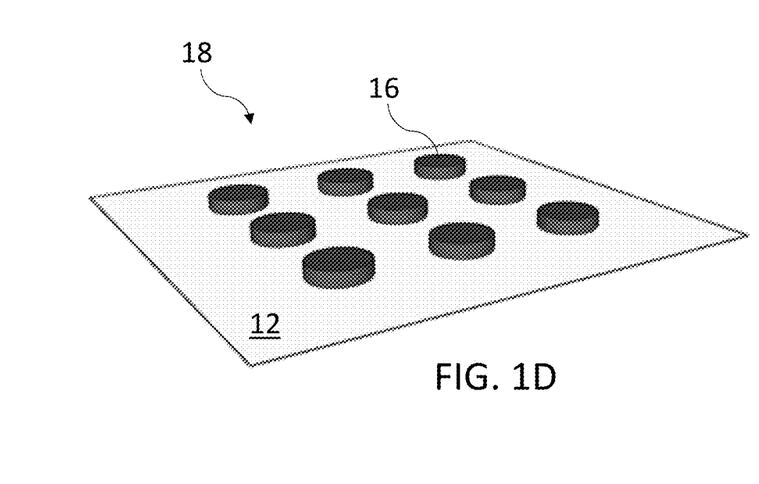
FIG. 1D depicts a perspective view of a two-dimensional array of spacers arranged on a membrane, in accordance with one embodiment of the invention.

Referring now to FIGS. 1A-1D, examples of spacers of the kind discussed immediately above are illustrated. FIGS. 1A and 1B illustrate examples of spacers 10 disposed on a membrane 12. In particular, FIG. 1A shows a cross-sectional view of a spacer 10 disposed on membrane 12, while FIG. 1B shows an array 14 of spacers 10 disposed on membrane 12. In this example, the spacers 10 are 10 mil (0.254 mm) thick and 1.3 mm in diameter. FIG. 1C shows a cross-sectional view of a spacer 16 disposed on a membrane 12, while FIG. 1D shows an array 18 of spacers 16 disposed on membrane 12. In this example, the spacers 16 are 20 mil (0.508 mm) thick and 1.3 mm in diameter. As mentioned, these are only examples and spacers of other shapes and dimensions may be fashioned in accordance with the processes discussed herein.

Figure 2A:
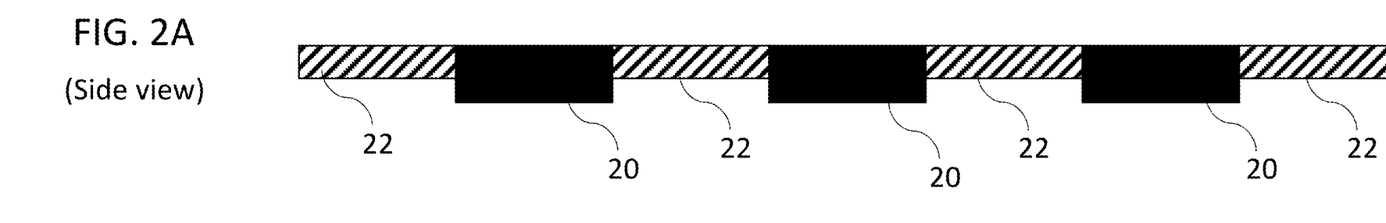
FIG. 2A depicts a cross-sectional view of a plurality of spacers separated from one another by lateral members, in accordance with one embodiment of the invention.

The fabrication process begins by molding the spacers using any conventional molding process. Referring to FIG. 2A, which shows a side view, and FIG. 2B, which shows a top view, the spacers 20 are molded (e.g., in a two dimensional array) so as to be connected to one another by lateral members 22. As shown in FIG. 2A, the thickness of each of the lateral members 22 may be less than the thickness of each of the spacers 20. Lateral members 22 may be formed from the same material as the spacers 20, or from a different material. For example, the lateral members 22 may be formed of a polymer, a metal or metal alloy, or a biocompatible organic material. The lateral members 22 are optional, but are preferably included so that the pattern of the spacers 20 is maintained when the spacers 20 are laminated to a substrate, as described below. In some cases, the spacers 20 may be individually laminated, rather than being laminated to the substrate as an array, but this would require accurate placement of the spacers 20 with respect to one another and so by molding the spacers 20 and the lateral members 22 together, the spacings of the spacers 20 with respect to one another can be more easily maintained during subsequent processing steps.

Figure 2B:
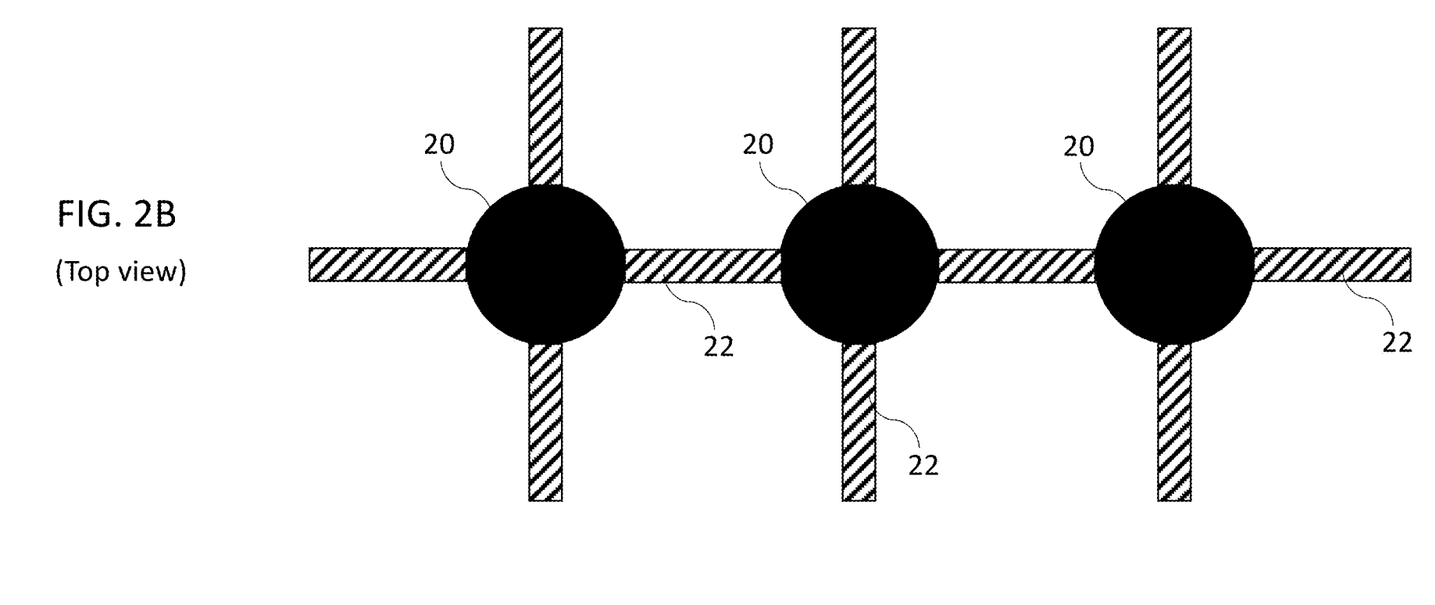
FIG. 2B depicts a top view of a plurality of spacers separated from one another by lateral members arranged in a cross arrangement, in accordance with one embodiment of the invention.

The form of the array in which the spacers 20 are arranged with respect to one another may be varied depending on the application. In FIGS. 1B, 1D, and 2B, a rectangular array is shown, however, in other embodiments a triangular, circular, hexagonal, or other shape of array may be used. In some cases, the spacers 20 may be molded in an irregular pattern with respect to one another rather than in a regular array.

Figure 3:
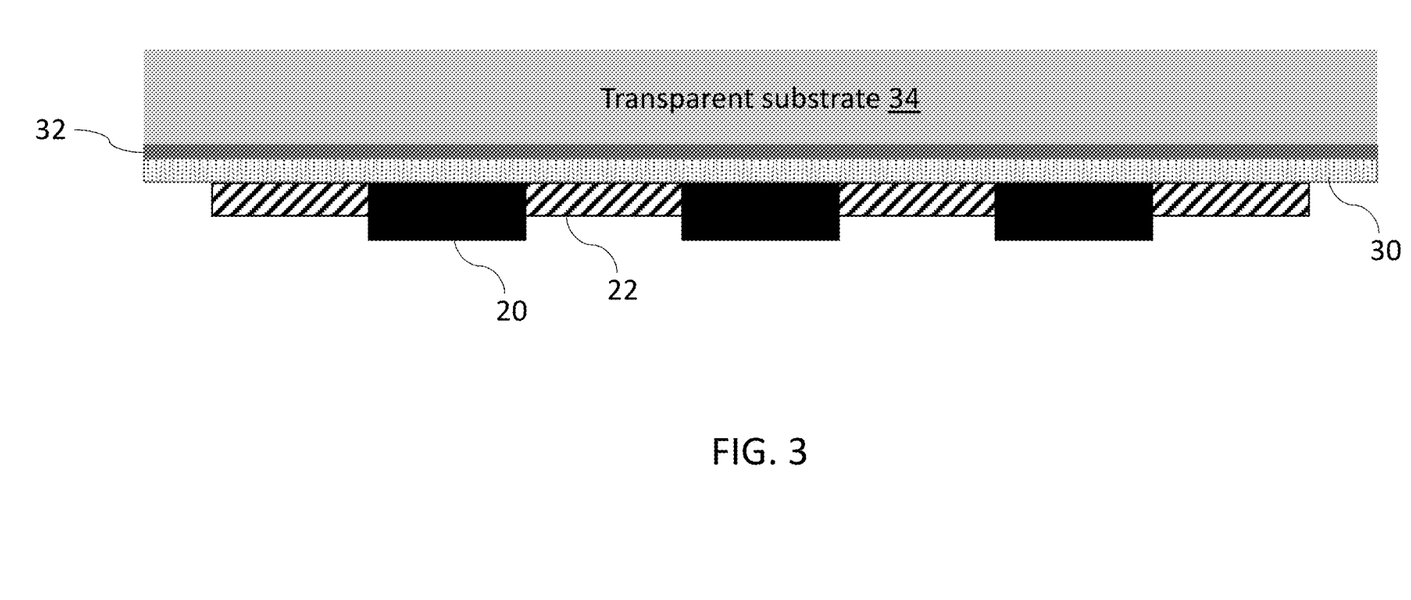
FIG. 3 depicts a cross-sectional view of a plurality of spacers attached to a transparent substrate via one or more intermediate layers (e.g., metal layer, adhesive layer), in accordance with one embodiment of the invention.

Once the respective lateral positions of the spacers 20 have been fixed, they are ready to be laminated onto a transparent substrate, such as a glass substrate. As shown in FIG. 3, this is accomplished by first coating the transparent substrate 34 with a thin (e.g., 5-10 nm thick) metal layer 32. For example, the thin metal layer 32 may be applied by chemical deposition (e.g., plating, chemical solution or chemical bath deposition, spin coating, dip coating, chemical vapor deposition (CVD), plasma enhanced CVD, atomic layer deposition, etc.); physical deposition (e.g., thermal evaporation, electron beam evaporation, molecular beam epitaxy, sputtering, pulsed laser deposition, etc.); or other thin film deposition process. The spacers 20 and lateral members 22 may then be laminated onto the thin metal layer 32 using a very thin (e.g., 1-2 micron thick) layer of adhesive or photopolymer 30.

Figure 4:
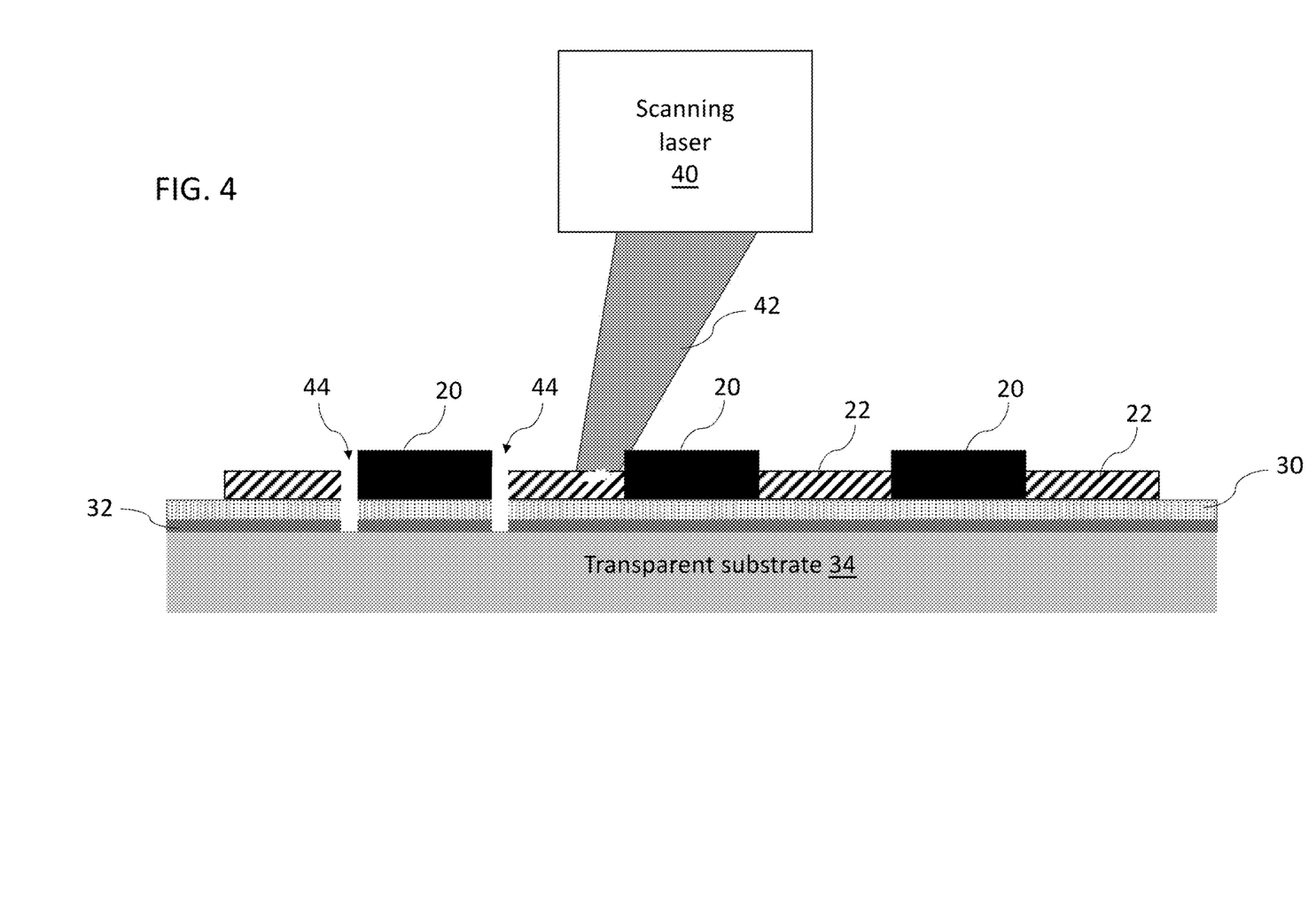
FIG. 4 depicts a scanning laser being used to direct a laser beam between adjacent ones of the spacers so as to sever one or more of the lateral members, in accordance with one embodiment of the invention.

Once the spacers 20 and lateral members 22 have been laminated onto the thin metal layer 32 on the transparent substrate 34, the lateral members 22 may be severed. Referring to FIG. 4, this cutting of the lateral members 22 may be performed using a scanning laser 40 (or other laser). By directing the laser beam 42 onto the lateral members 22, the lateral members 22 may be severed from the spacers 20, leaving spaces 44 about the circumference of each spacer 20. The laser spot size may be varied as appropriate. In other embodiments, the spacers 20 may be severed from the lateral members 22 using a saw or other cutting instrument. Preferably in such instances, a jig is fashioned to guide the movement of the cutting instrument, thereby preventing damage to the spacers 20.

Figure 5:
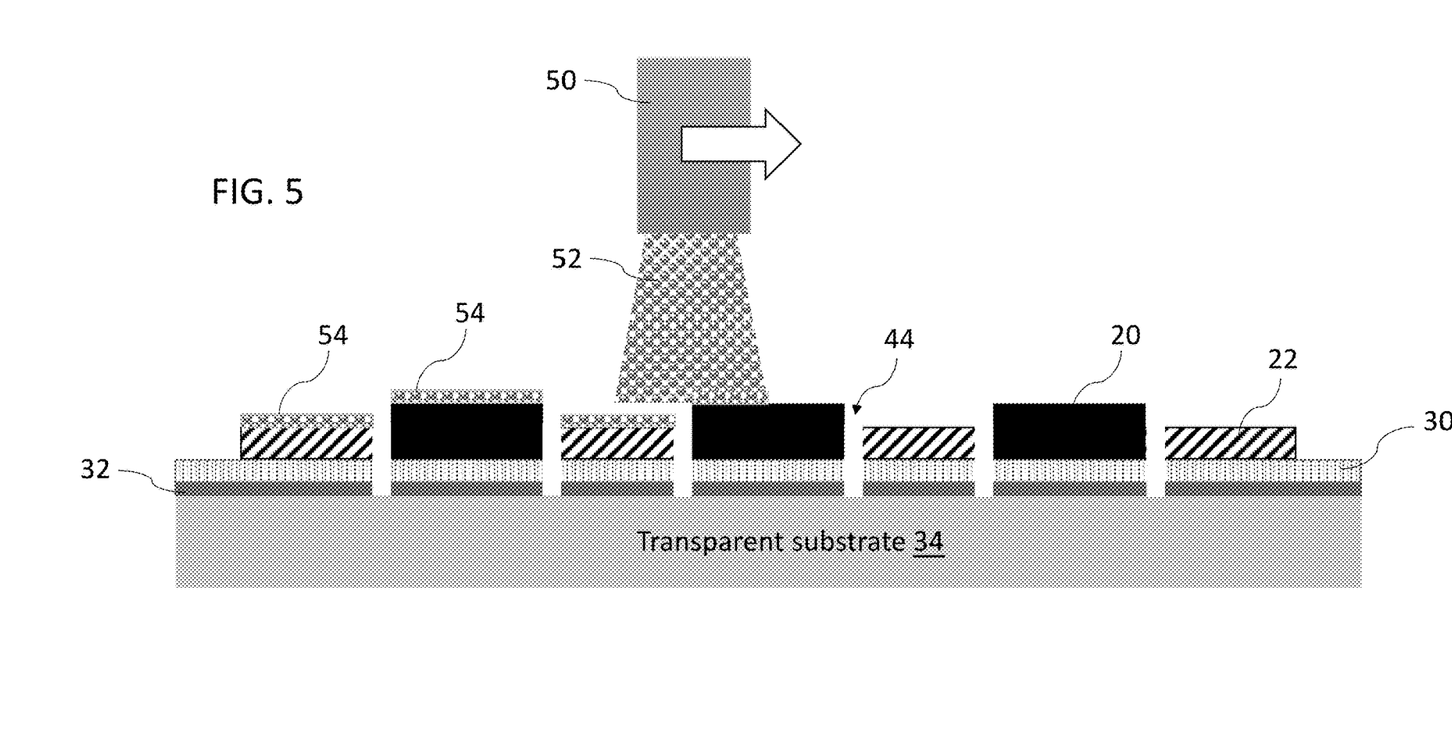
FIG. 5 depicts a sprayer member being used to apply a layer of adhesive onto respective surfaces of the spacers facing away from the transparent substrate, in accordance with one embodiment of the invention.

Once the spacers 20 have been severed from the lateral members 22, then, as shown in FIG. 5, a layer 54 of adhesive is coated onto the upper surface of the spacers 20. This may be performed using a spraying apparatus 50 to spray a coating of the adhesive 52. The spraying apparatus 50 may be moved relative to the transparent substrate 34 holding the spacers 20 while the adhesive 52 is sprayed thereon. Alternatively, the layer of adhesive 54 may be applied by a roller that is moved over the top of the spacers 20. Other forms of application of the layer of adhesive 54 may be used.

Figure 6:
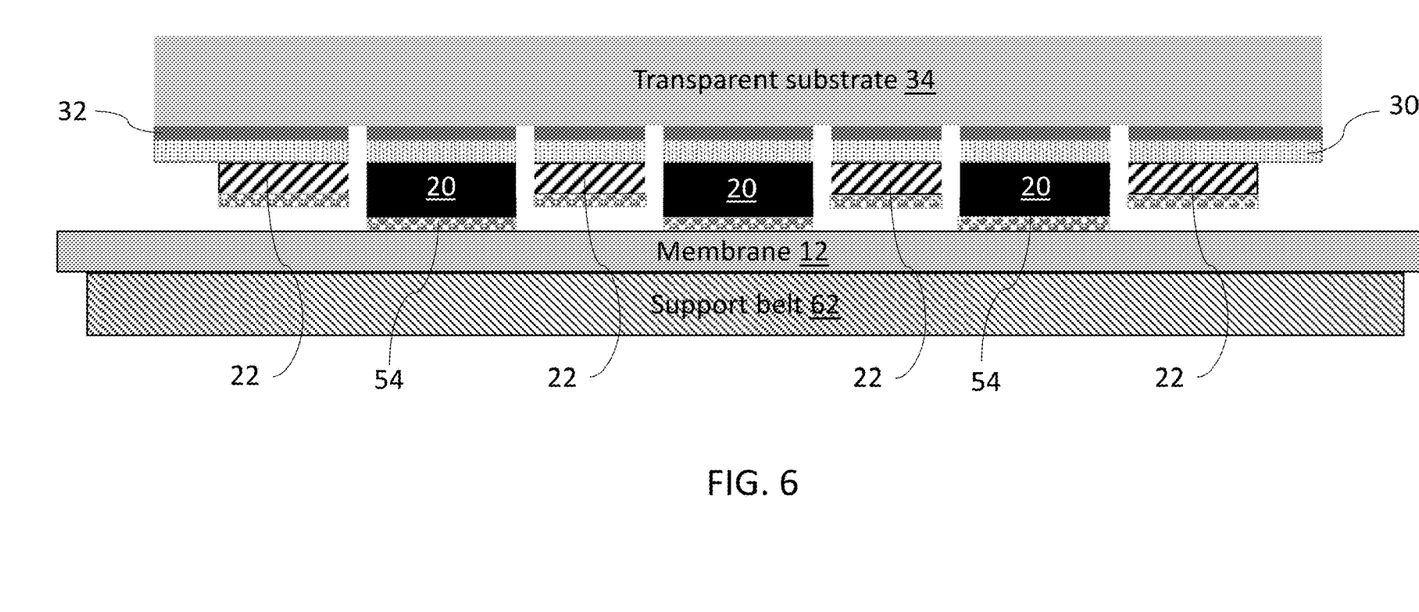
FIG. 6 depicts the spacers being attached to a membrane via the adhesive layer, in accordance with one embodiment of the invention.

With the layer 54 of adhesive applied, the spacers 20 may be glued onto a membrane 12, as shown in FIG. 6. The membrane 12 is preferably made of a biocompatible material, such as a polymer, and may be supported by a support belt 62 or other rigid member. As illustrated, with the spacers 20 adhered to the transparent substrate 34, the spacers 20 are brought into contact with the membrane 12 and the layer 54 of adhesive is cured, e.g., by allowing it to set over time, by exposure to heat or certain wavelengths of light (e.g., ultraviolet light), by pressing the transparent substrate 34 towards the membrane 12, or a combination of these methods. Although curing through exposure to certain wavelengths of light may be used, it is not necessarily a preferred method as past results using such techniques have not always proved satisfactory. Further, depending on the material of the membrane 12, exposure to ultraviolet light may damage or otherwise compromise the membrane 12. Hence, curing through other means, such as pressure, temperature, and/or time, is preferred.

Figure 7:
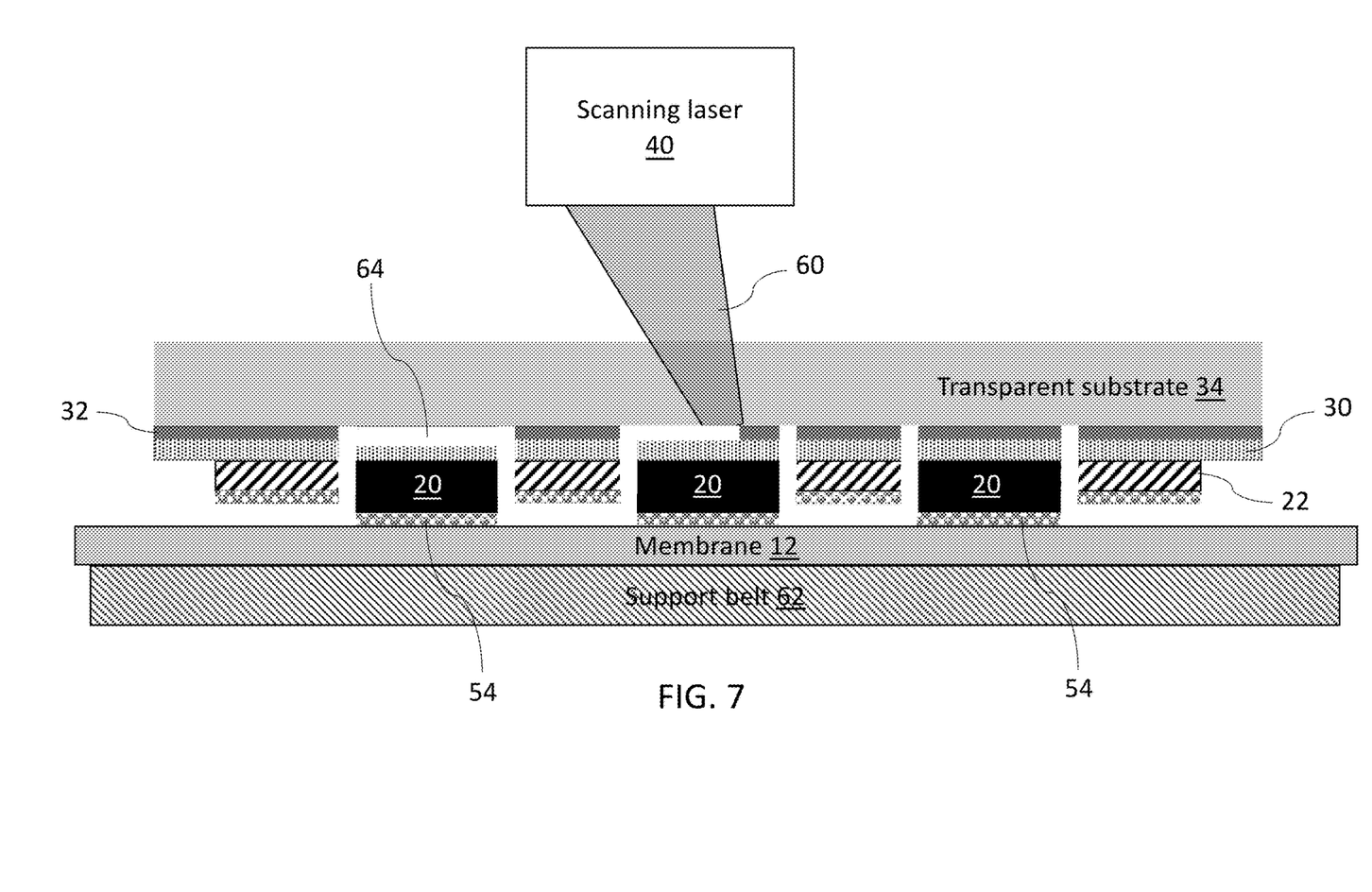
FIG. 7 depicts the spacers being detached from the transparent substrate after the spacers have been attached to a membrane, in accordance with one embodiment of the invention.

Once the spacers 20 have been glued to membrane 12 and the adhesive 54 cured, the transparent substrate 34 and lateral members 22 may be removed, as illustrated in FIG. 7. As shown, a scanning laser 40, which may be the same laser used to sever the lateral members 22 or a different laser, is used to provide a laser beam 60 that is directed through the transparent substrate 34 onto areas of the metal layer 32 corresponding to positions at which the spacers 20 are adhered to the transparent substrate 34. The laser spot size may be varied as appropriate. The laser beam 60 may vaporize the thin metal layer 32 in areas where laser beam 60 is incident on the metal layer 32, thus severing the spacers 20 from the transparent substrate 34 and leaving a gap 64. This is a laser-based release of the spacers 20 from the transparent substrate 34. If not already apparent, the transparent substrate 34 may be transparent to only certain wavelengths of light (i.e., and not to all wavelengths of light) and these certain wavelengths should coincide with the wavelength(s) of the laser beam 60.

Figure 8:
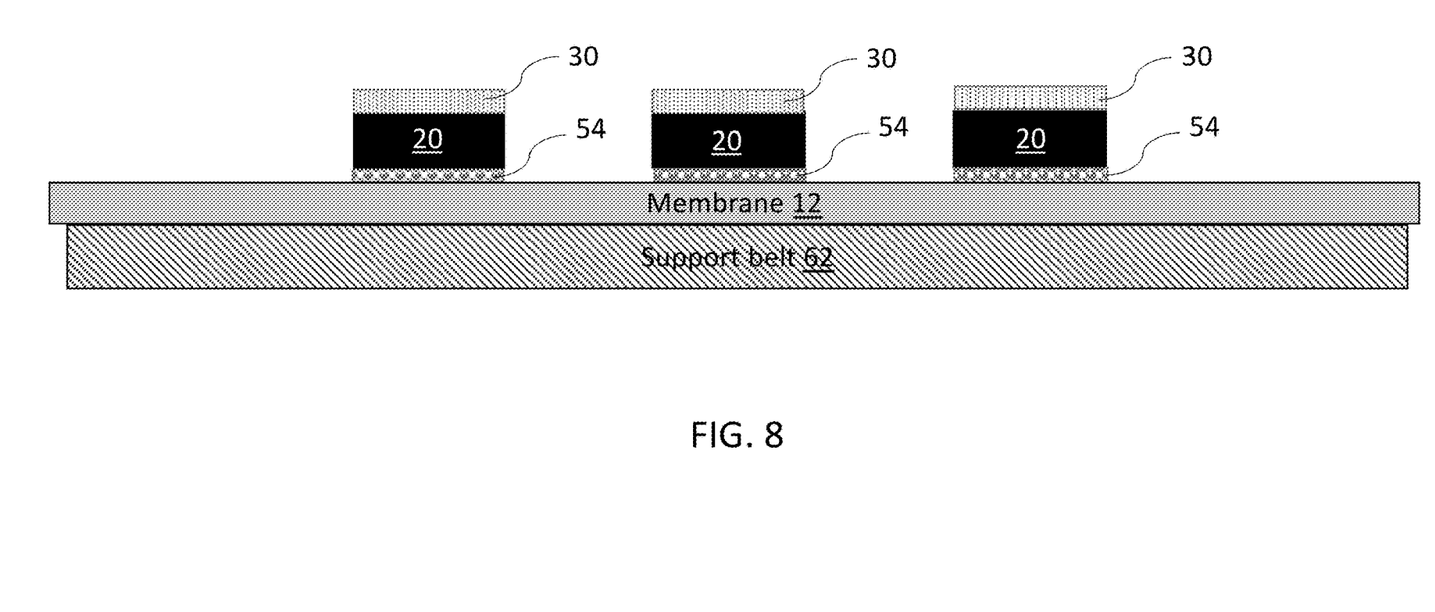
FIG. 8 depicts an arrangement of spacers attached to a surface of a membrane via an adhesive, in accordance with one embodiment of the invention.

The result of the laser-based release of the spacers 20 is shown in FIG. 8. Once the spacers 20 have been severed from the transparent substrate 34, that substrate can be removed, taking the still-adhered lateral members 22 with it, and leaving behind the spacers 20 that are now glued to the membrane 12.

The present method provides various advantages over past processes used to create the array of spacers on a membrane, which relied on techniques such as screen printing. Those prior techniques tended to produce spacer arrangements of inexact dimensions. In contrast, the present methods can provide spacer arrangements on the membrane with well-defined spacings that are accurate to a very fine tolerance. Further, by utilizing curing processes for the adhesive that glues the spacers to the membrane other than exposure to ultraviolet light, the present methods avoid damaging the membrane 12, which may be damaged by UV light.

Figure 9:
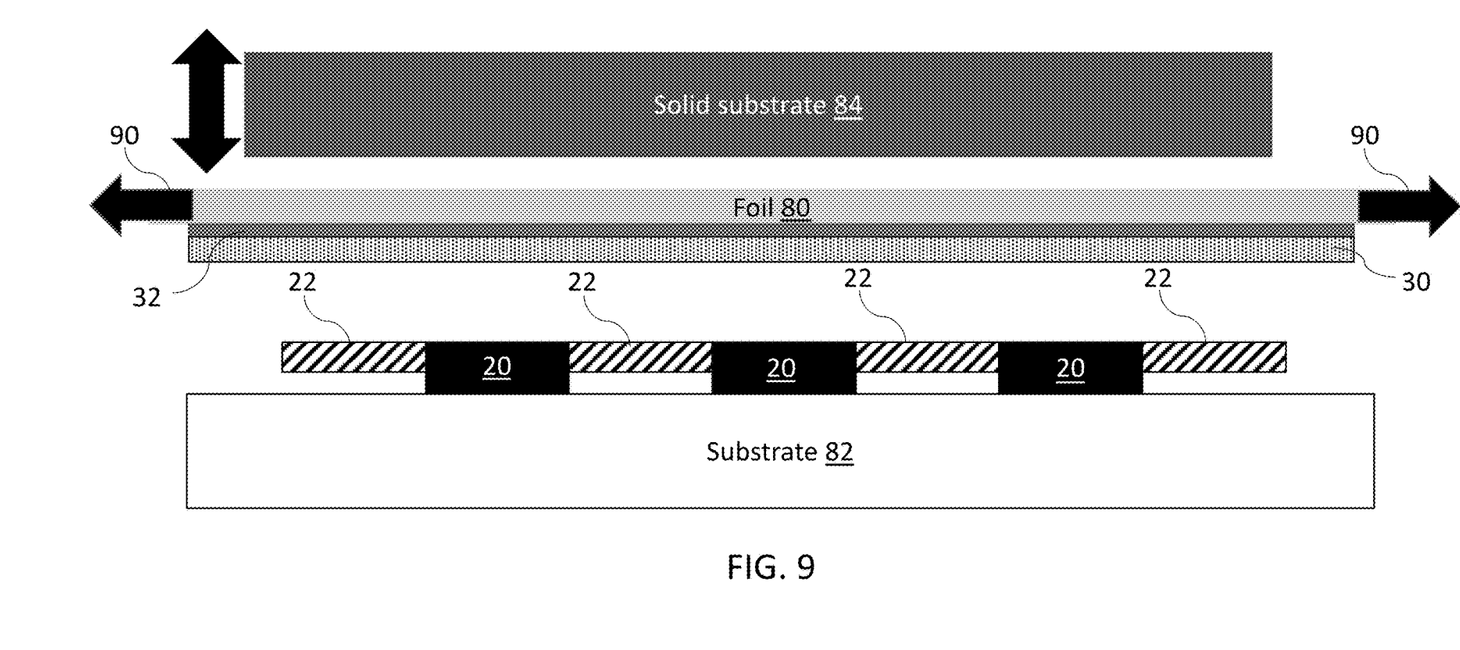
FIG. 9 depicts a plurality of spacers and a foil under tension prior to the spacers being attached to the foil, in accordance with one embodiment of the invention.
Figure 10:
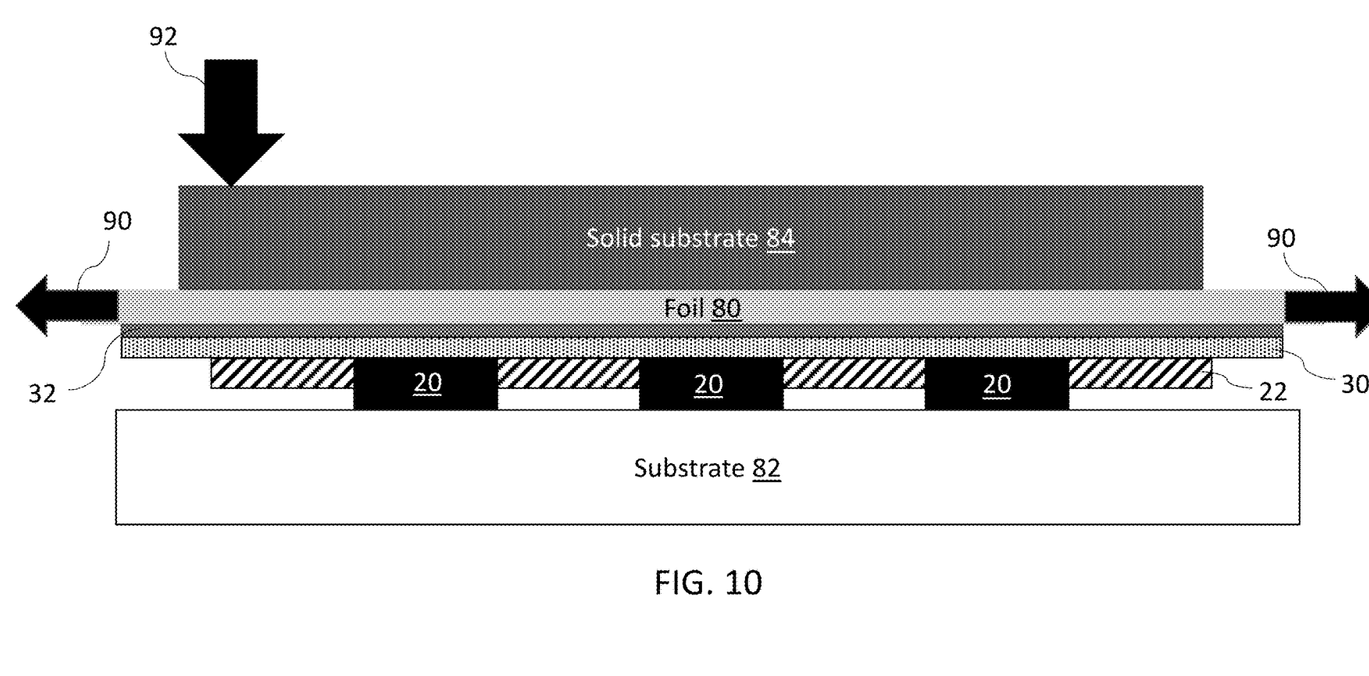
FIG. 10 depicts the plurality of spacers being attached to the foil under tension, in accordance with one embodiment of the invention.

FIGS. 9-12 now show steps in an alternative method for producing the arrangement of the spacers 20 on the membrane. This alternative method is a further embodiment of the present invention and makes use of a coated metal foil 80. As shown in FIG. 9, the spacers 20 and lateral members 22 may be formed by molding, as described above, and provided on a substrate 82. For example, the spacers 20 and lateral members 22 may be molded in situ on the substrate 82. A metal foil 80 is maintained under tension, as indicated by arrows 90. The metal foil 80 may be coated with a sacrificial metal layer 32 and adhesive layer 30, and the spacers 20 may be laminated on the metal foil 80 by bringing the spacers 20 into contact with adhesive layer 30 and applying pressure 92 using a solid substrate 84 or a thermal press, as shown in FIG. 10. The substrate 84 may be heated, for example to help cure the adhesive 30 to the spacers 20. Adhesive 30 may be a thermal glue, or may be a glue that is activated by exposure to certain wavelengths of light (e.g., ultraviolet light), in which case substrate 84 would need to be transparent so as to allow light from an ultraviolet lamp to irradiate the adhesive layer 30 after the spacers 20 have been brought into contact with the adhesive layer 30. Alternatively, the spacers 20 may be made of a material that will adhere to the metal foil 80 and/or the sacrificial metal layer 32, for example, in the presence of heat and/or pressure. This would avoid the need for a separate adhesive layer 30. Substrate 82 may also be heated to assist in the laminating process.

Figure 11:
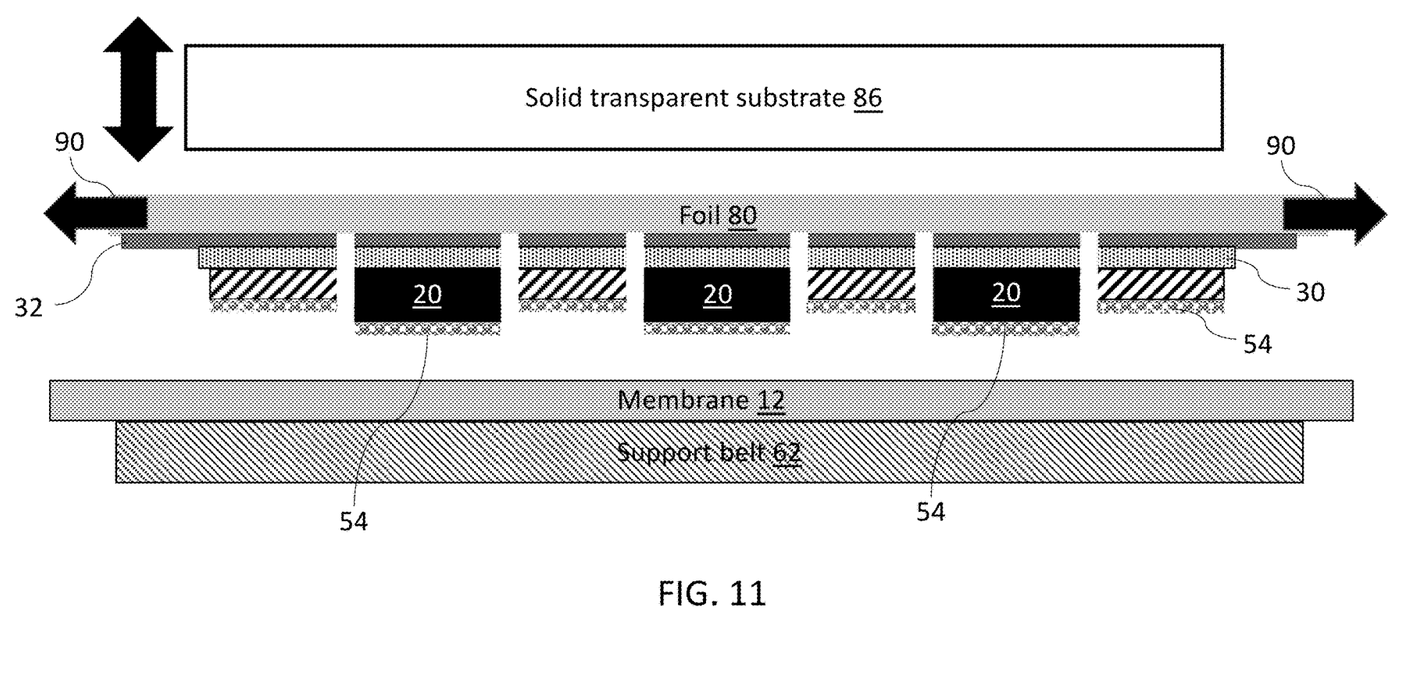
FIG. 11 depicts a plurality of spacers and a membrane prior to the spacers being transferred from the foil to the membrane, in accordance with one embodiment of the invention.
Figure 12:
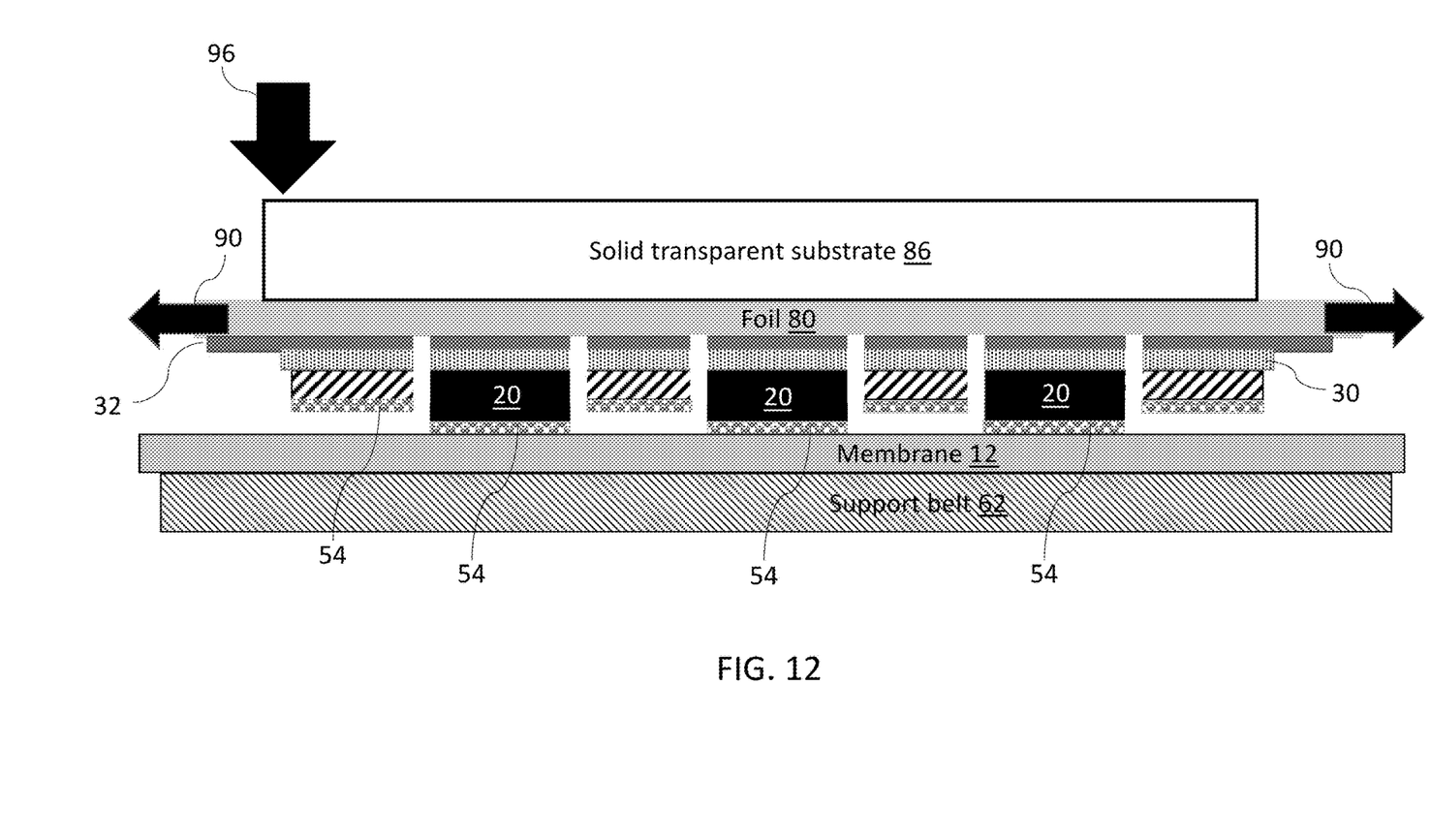
FIG. 12 depicts the spacers being transferred from the foil to the membrane, in accordance with one embodiment of the invention.

Once the spacers 20 have been laminated to metal foil 80, they may be severed from the lateral members 22 and sprayed with an adhesive 52, as discussed above, and then the foil 80, with the spacers 20 laminated thereon, may be brought into position near membrane 12, as shown in FIG. 11. During this time, the metal foil 80 may be maintained under tension so as to maintain the spacing of the spacers 20 relative to one another. As shown in FIG. 12, the foil may then be moved relative to the membrane 12, which is resting on a support belt 62, and pressure 96 may be applied via a solid transparent substrate 86 placed over the metal foil 80 so as to adhere the spacers 20 to the membrane 12. The layer 54 of adhesive may be cured by pressing the substrate 86 towards the membrane 12, and, optionally, by applying heat. Once the spacers 20 have been glued to membrane 12 and the adhesive layer 54 cured, a laser beam 60 (not depicted in FIG. 12) may be directed through the substrate 86 and metal foil 80 onto areas of the metal layer 32 corresponding to positions at which the spacers 20 are adhered to the membrane 12. The laser spot size may be varied as appropriate. The laser beam 60 may vaporize the thin metal layer 32 in areas where the laser beam 60 is incident on the metal layer 32, thus severing the spacers 20 from the metal foil 80 in a fashion similar to the laser-based release of the spacers 20 from the transparent substrate 34, as discussed above in connection with FIG. 7. Substrate 86 may then be removed, taking the lateral members 22 with it, and the result will resemble that shown in FIG. 8 with the spacers 20 adhered to membrane 12.

Following the gluing of the spacers 20 on the membrane 12, residual portions of the adhesive layer 30 may remain on the top surface of the spacers 20 and these residual portions of the adhesive layer 30 be removed, if desired. For example, these residual portions of the adhesive layer 30 may be removed by laser ablation or by other means. Alternatively, if the adhesive layer 30 is biocompatible, it may be allowed to remain in place.

Thus, methods for depositing spacers on a substrate have been described. Many other embodiments will be apparent to those of skill in the art upon reviewing the above description. The scope of the invention should, therefore, be determined with reference to the appended claims, along with the full scope of equivalents to which such claims are entitled.

LIST OF REFERENCE NUMERALS

10 Spacer
12 Membrane
14 Array of spacers
16 Spacer
18 Array of spacers
20 Spacer
22 Lateral member
30 Layer of adhesive or photopolymer
32 Metal layer
34 Transparent substrate
40 Scanning laser
42 Laser beam
44 Space
50 Spraying apparatus
52 Adhesive
54 Layer of adhesive
60 Laser beam
62 Support belt
64 Gap
80 Metal foil
82 Substrate
84 Solid substrate
86 Solid transparent substrate
90 Arrows
92, 96 Pressure

What is claimed is:

1. A method for attaching spacers to a membrane, the method comprising:
   attaching adjacent ones of the spacers to one another via respective lateral members so as arrange the spacers with a fixed relative spacing between the adjacent ones of the spacers, wherein a thickness of each of the lateral members is less than a thickness of each of the spacers;
   attaching the spacers, arranged with the fixed relative spacing, to a transparent substrate;
   severing at least a portion of each of the lateral members so that the adjacent ones of the spacers are no longer attached to one another via the respective lateral members;
   coating a respective surface of each of the spacers facing away from the transparent substrate with a first adhesive layer;
   attaching the spacers to a membrane via the first adhesive layer; and
   detaching the spacers from the transparent substrate.

2. The method of claim 1, wherein a first one of the spacers is attached to four of the lateral members that are arranged in a cross arrangement.

3. The method of claim 1, wherein the transparent substrate comprises one of a glass substrate or a metal foil.

4. The method of claim 1, wherein severing the at least portion of each of the lateral members comprises guiding a saw between the adjacent ones of the spacers.

5. The method of claim 1, wherein the spacers are attached to the transparent substrate via a second adhesive layer.

6. The method of claim 5, wherein severing the at least portion of each of the lateral members comprises directing a laser beam between the adjacent ones of the spacers.

7. The method of claim 6, wherein directing the laser beam between adjacent ones of the spacers further ablates portions of the second adhesive layer.

8. The method of claim 7, wherein the spacers are attached to the transparent substrate via a metal layer.

9. The method of claim 8, wherein directing the laser beam between the adjacent ones of the spacers further ablates first portions of the metal layer that are not disposed between the transparent substrate and the spacers.

10. The method of claim 9, wherein detaching the spacers from the transparent substrate comprises directing the laser beam towards each of the spacers so as to ablate second portions of the metal layer that are disposed between the transparent substrate and the spacers.

11. The method of claim 1, wherein attaching the spacers to the transparent substrate comprises transferring the spacers and the lateral members from a first substrate to the transparent substrate.

12. The method of claim 1, wherein the spacers and lateral members are formed from an identical material.

13. The method of claim 1, wherein the spacers are formed from a first material and the lateral members are formed from a second material different from the first material.

14. The method of claim 1, wherein the spacers are arranged in a two-dimensional array.

15. The method of claim 1, wherein the spacers are formed from one or more of a metal, a metal alloy, a biocompatible organic material, or a polymer.

* * * * *